(12) United States Patent
Hahn (10) Patent No.: US 8,379,030 B1
(45) Date of Patent: Feb. 19, 2013

(54) COMPUTER GRAPHICS VARIABLE TRANSFORMATION INTERFACE

(75) Inventor: Tom Hahn, Piedmont, CA (US)

(73) Assignee: Pixar, Emeryville, CA (US)

( * ) Notice: Subject to any disclaimer, the term of this patent is extended or adjusted under 35 U.S.C. 154(b) by 1324 days.

(21) Appl. No.: 12/114,541

(22) Filed: May 2, 2008

Related U.S. Application Data (60) Provisional application No. 60/916,330, filed on May 7, 2007.

(51) Int. Cl.
*G06T 13/00* (2006.01)

(52) U.S. Cl. .......................... 345/474; 345/442; 345/419

(58) Field of Classification Search .................. None
See application file for complete search history.

(56) References Cited

U.S. PATENT DOCUMENTS

| | | | | |
|---|---|---|---|---|
| 6,005,589 | A * | 12/1999 | Unuma et al. | 345/473 |
| 6,154,221 | A * | 11/2000 | Gangnet | 345/442 |
| 6,178,432 | B1 * | 1/2001 | Cook et al. | 715/201 |
| 6,469,702 | B1 * | 10/2002 | Sheasby et al. | 345/442 |
| 2004/0257368 | A1 * | 12/2004 | Anderson | 345/473 |
| 2005/0068340 | A1 * | 3/2005 | Lipsky et al. | 345/661 |
| 2005/0156932 | A1 * | 7/2005 | Vienneau et al. | 345/473 |
| 2005/0184992 | A1 * | 8/2005 | Podesta et al. | 345/473 |
| 2005/0253846 | A1 * | 11/2005 | Russ et al. | 345/473 |
| 2006/0192783 | A1 * | 8/2006 | Kass et al. | 345/473 |
| 2007/0073705 | A1 * | 3/2007 | Gray | 707/10 |
| 2007/0159487 | A1 * | 7/2007 | Felt | 345/474 |
| 2008/0198165 | A1 * | 8/2008 | Sawazaki et al. | 345/467 |
| 2009/0009321 | A1 * | 1/2009 | McClellan et al. | 340/539.13 |
| 2010/0214313 | A1 * | 8/2010 | Herman et al. | 345/593 |

* cited by examiner

*Primary Examiner* — James A Thompson
*Assistant Examiner* — David H Chu
(74) *Attorney, Agent, or Firm* — Patterson & Sheridan, LLP (57) ABSTRACT

A transformation region is displayed around a selection of knots defining one or more computer graphics variable curves. The transformation region includes transformation handles enabling the modification of the transformation region shape. The transformation region defines an envelope of the curves. Modifying the shape of the transformation region defines a new envelope of the curves. The input and/or output values of knots are scaled to match the modified envelope so that the computer graphics variable remains a function of its input variables. Associated tangent handles of the knots are scaled proportional to the knot value. The transformation region can include a retiming curve specifying a remapping of input variable values. Points on the retiming curve below this diagonal remap associated knots to lower input values. Point on the retiming curve above the diagonal remap associated knots to higher input values.

25 Claims, 11 Drawing Sheets

FIG. 11

COMPUTER GRAPHICS VARIABLE TRANSFORMATION INTERFACE

CROSS-REFERENCE TO RELATED APPLICATIONS

This application claims priority to U.S. Provisional Patent Application No. 60/916,330, filed May 7, 2007, which is incorporated by reference herein for all purposes.

BACKGROUND

The present invention relates to the field of computer graphics, and in particular to methods and apparatus for assigning attribute values to surfaces of computer graphics models. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

In computer-generated animation, an object's appearance is defined by a three-dimensional computer model. To appear realistic, the computer model of an object is often extremely complex, having millions of surfaces and tens of thousands of attributes. Due to the complexity involved with animating such complex models, particularly character models with hundreds or thousands of degrees of freedom, animation tools often rely on computer graphics variables to define the attributes of objects. Examples of computer graphics variables include animation variables, shader relationships, weighting relationships, and mappings of influence between computer graphics components. Computer graphics variable functions associate input values to a corresponding output values according to some rule or mathematical expression. Computer graphics variable functions may be functions of an input time variable or any other type of input.

For example, animation variables, which are sometimes referred to as avars, are parameters used by functions to modify the position, or pose, of all or a portion of a model. Animation variables and their associated functions can specify relatively simple motions, such as the translation and rotation of objects. Animation variables and their associated functions are also used to abstract complicated modifications to a model to a relatively simple control. For example, animation variables can specify the rotation angles of the joints of a character model, thereby positioning the character model's limbs and appendages. More complicated animation variables can define the degree of opening of a character's mouth. In this example, the value of the animation variable is used to determine the position of the many different parts of the character model needed to open the characters mouth to the desired degree. The animation tools then modify the character model according to the final posed armature to create a character model with an open mouth.

Users define computer graphics images and animated sequences by specifying the values of computer graphics variables of an object, and hence the pose of an object, at one or more key frames. A pair of a computer graphics variable value and its associated input value, such as a time value, is referred to as a knot. The animation system determines the pose of an object in the frames between key frames by interpolating the values of its computer graphics variables from the knots. A variety of different interpolation schemes are used in animation, including linear, cubic, b-spline, Bezier, and Catmull-Rom. Typically, animation tools will display a line or curve, such as a spline curve, defined by one or more knots of computer graphics variable. Depending on the type of interpolation, animation tools may also allow users to adjust the slope or curvature of the interpolated computer graphics variable curve.

Precise control of the timing, values, and interpolation of computer graphics variable knots is essential to achieving artistically effective animation. Subtle adjustments in the value, timing, and interpolation of knots can greatly change the artistic impact of animation. During animation, many gestures or actions are comprised of large numbers of knots from one or more computer graphics variables acting in concert to achieve the desired motion. For example, a sequence of knots of a single computer graphics variable might define how a character's mouth opens during a sequence of dialog. In another example, a sequence of knots for multiple computer graphics variables might define a character's arm and hand movements while waving or pointing.

Because animation is often defined by large numbers of related computer graphics variable knots, manually adjusting individual computer graphics variable knots is time consuming, error-prone, and inflexible.

It is desirable for animation tools to provide an interface for simultaneously modifying large numbers of computer graphics variable knots in an intuitive and controllable manner It is also desirable for animation tools to provide similar interfaces for modifying computer graphics variable knots associated with a single computer graphics variable or with multiple computer graphics variables.

BRIEF SUMMARY

An embodiment of the invention receives a selection of computer graphics variable knots defining one or more computer graphics variable curves and surrounds the selected computer graphics variable knots with a transformation region. The transformation region includes a number of transformation handles. By dragging or moving transformation handles, users may modify the input values and/or output values of the knots or the shapes of the associated curves. As the selected computer graphics variable knots are transformed, unselected computer graphics variable knots may be shifted in position or overwritten by the transformed computer graphics variable knots.

In an embodiment, the transformation region defines an envelope of the computer graphics variable curves. Modifying the shape of the transformation region defines a new envelope of the curves. An embodiment of the invention scales the input and/or output values of knots to match the modified envelope. An embodiment of the invention scales knots to match the envelope in such a way that the computer graphics variable remains a function of its input variables regardless of the transformation.

In an embodiment, computer graphics variable knots are associated with tangent handles defining the slopes of the computer graphics variable curves. In a further embodiment, as computer graphics variable knots are scaled or transformed via the transformation region, the associated tangent handles of the computer graphics variable knots are scaled proportionally so that relative motion stays similar. In this embodiment, the tangent handles are not modified to match the slope of the envelope. This ensures that the transformed computer graphics variable curve remains a function of an input variable.

In an embodiment, the transformation region can include a retiming curve enabling users to specify a remapping of input variable values. By default, a straight-line diagonal retiming curve represents a one-to-one mapping of input values. If a point on the retiming curve is below this diagonal, knots with this input value are remapped to a lower input value. If a point on the retiming curve is above the diagonal, knots with this input value are remapped to a higher input value.

BRIEF DESCRIPTION OF THE DRAWINGS

The invention is described with reference to the drawings, in which.

DETAILED DESCRIPTION

Figure 1:
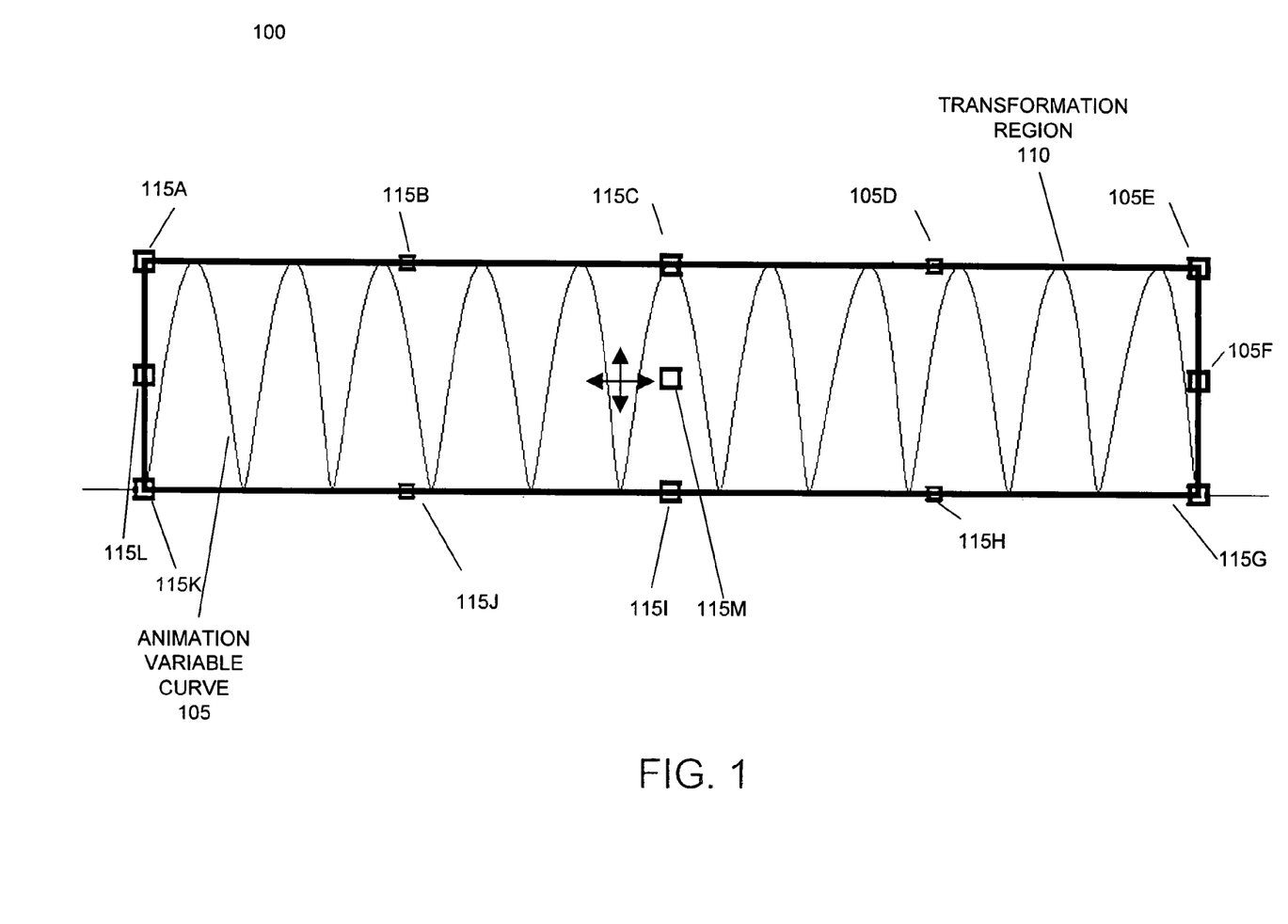
FIG. 1 illustrates an example computer graphics variable curve transformation interface according to an embodiment of the invention.

FIG. 1 illustrates an example computer graphics variable curve transformation interface 100 according to an embodiment of the invention. A computer graphics variable curve 105 is defined by multiple knots defining computer graphics variable values at specific input values. Computer graphics variable curve 105 defines function values at input values between the knots and optionally at the input values associated with knots. In this example, time is displayed on the horizontal axis and computer graphics variable values on the vertical axis. Any mathematical technique known in the art for interpolating function values or defining curves from two or more discrete knots may be utilized to define computer graphics variable curve 105 and its associated function.

When computer graphics variable knots of all or a portion of one or more computer graphics variable curves are selected for transformation, an embodiment of the invention surrounds the selected computer graphics variable knots and their associated computer graphics variable curve 105 with a transformation region 110. A transformation region, which is visually represented as a bounding box or arbitrarily shaped region, includes a number of transformation handles 115. As described in detail below, by dragging or moving transformation handles 115, an embodiment of the invention modifies the time and values of the computer graphics variable knots within the transformation region 110. For example, dragging the center transformation handle 115$m$ will shift the selected computer graphics variable knots vertically to change their computer graphics variable values or horizontally to change the time values of the selected computer graphics variable knots. As the selected computer graphics variable knots are transformed, unselected computer graphics variable knots may be shifted in position or overwritten by the transformed computer graphics variable knots.

Figure 2A:
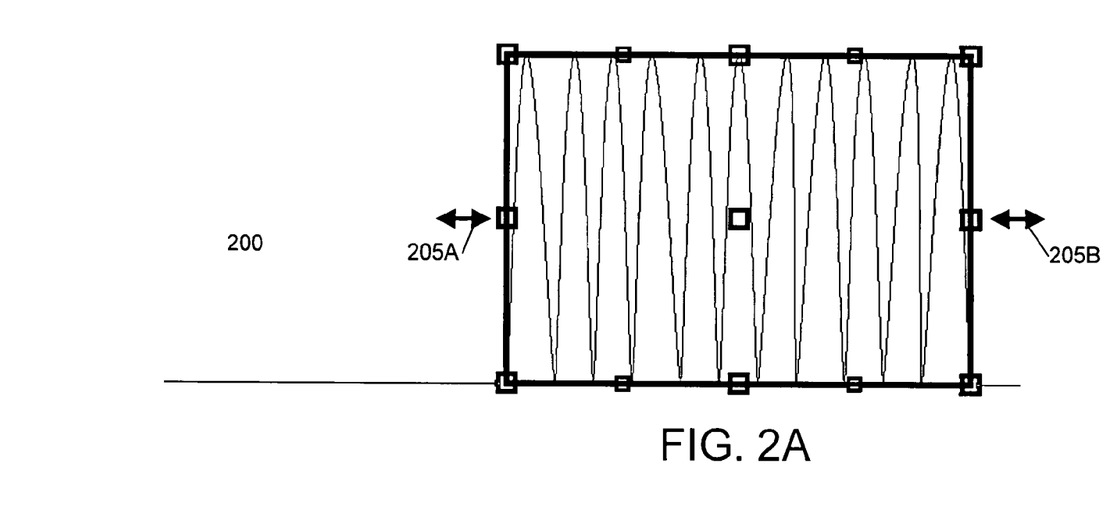
FIGS. 2A-2B illustrate example transformations of computer graphics variable knots using a transformation interface according to an embodiment of the invention.
Figure 2B:
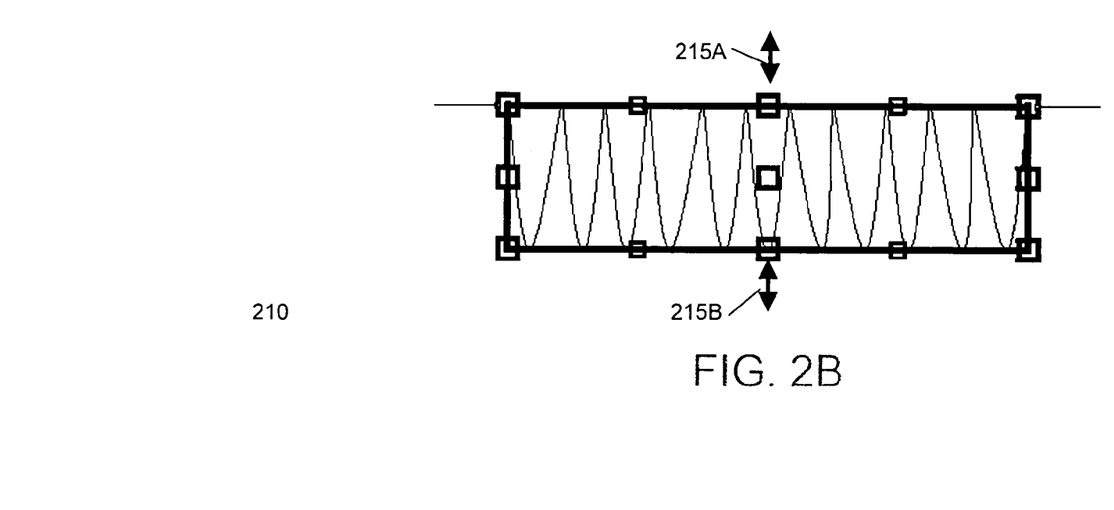

FIGS. 2A-2B illustrate example transformations of computer graphics variable knots. In the example 200 of FIG. 2A, dragging the left 205$a$ or right 205$b$ center handle horizontally will linearly scale the time values of the selected computer graphics variable knots. During this scaling in time, the computer graphics variable knot values will be unchanged. In an embodiment, the scaling is centered on the opposite side of the transformation region. For example, horizontally dragging the left center handle 205$a$ will scale the selected computer graphics variable knots in time centered on the right edge of the transformation region.

Similarly, in the example 210 of FIG. 2B, dragging the top 215$a$ or bottom 215$b$ center handle vertically will linearly scale the computer graphics variable values of the selected computer graphics variable knots. During this computer graphics variable value scaling, the time values of computer graphics variable knots will be unchanged. In an embodiment, the scaling is centered on the opposite side of the transformation region. For example, vertically dragging the top center handle 215$a$ will scale the computer graphics variable values of the selected knots centered on the bottom edge of the transformation region.

Figure 3:
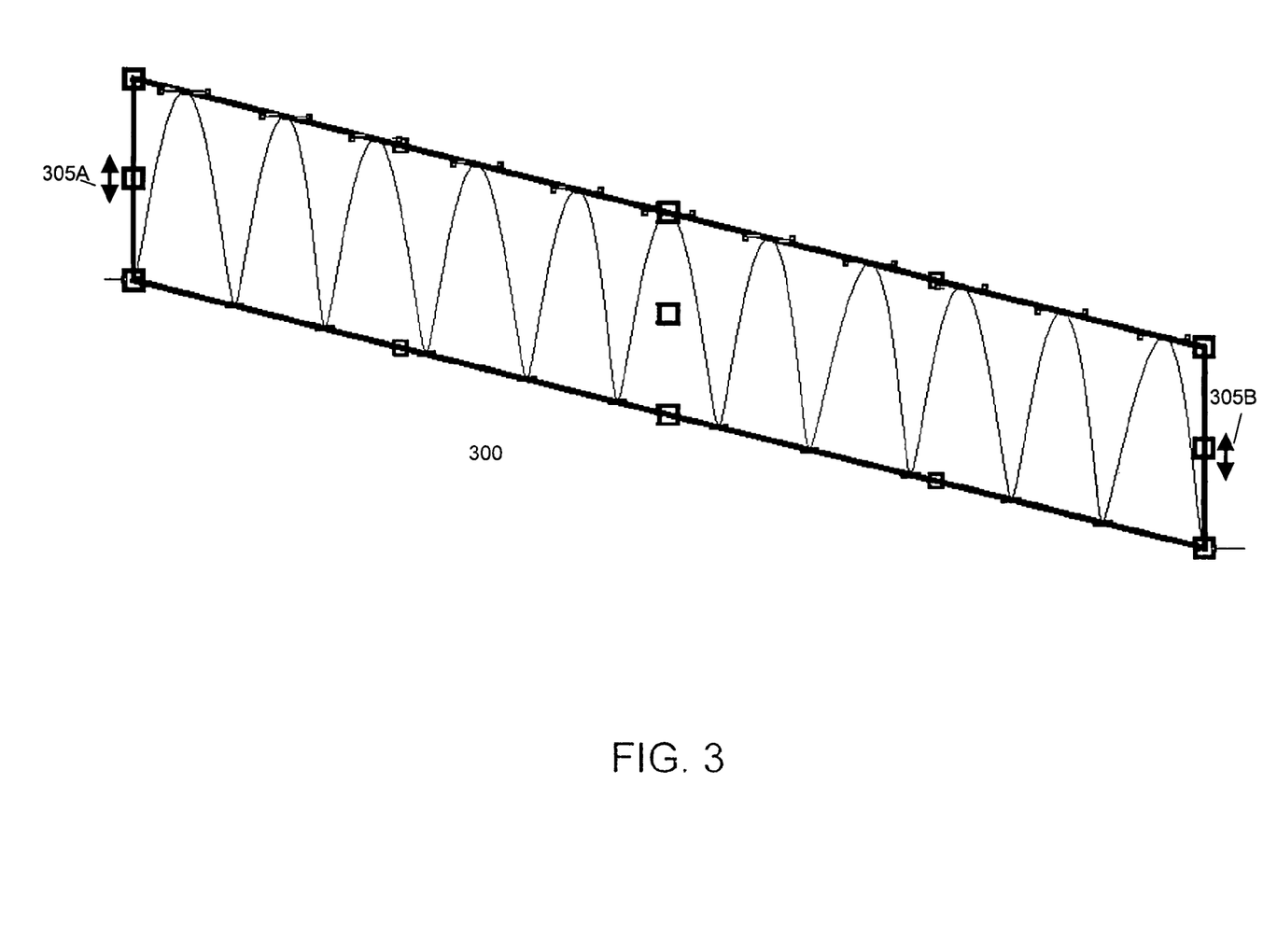
FIG. 3 illustrates an example transformation of computer graphics variable knots using a transformation interface according to an embodiment of the invention.

FIG. 3 illustrates an example transformation 300 of computer graphics variable knots. In addition to dragging the left and right center handles horizontally, these handles 305 can also be dragged vertically. By dragging these handles 305 vertically, a linearly increasing or decreasing offset is added to the computer graphics variable values of the selected computer graphics variable knots.

Figure 4:
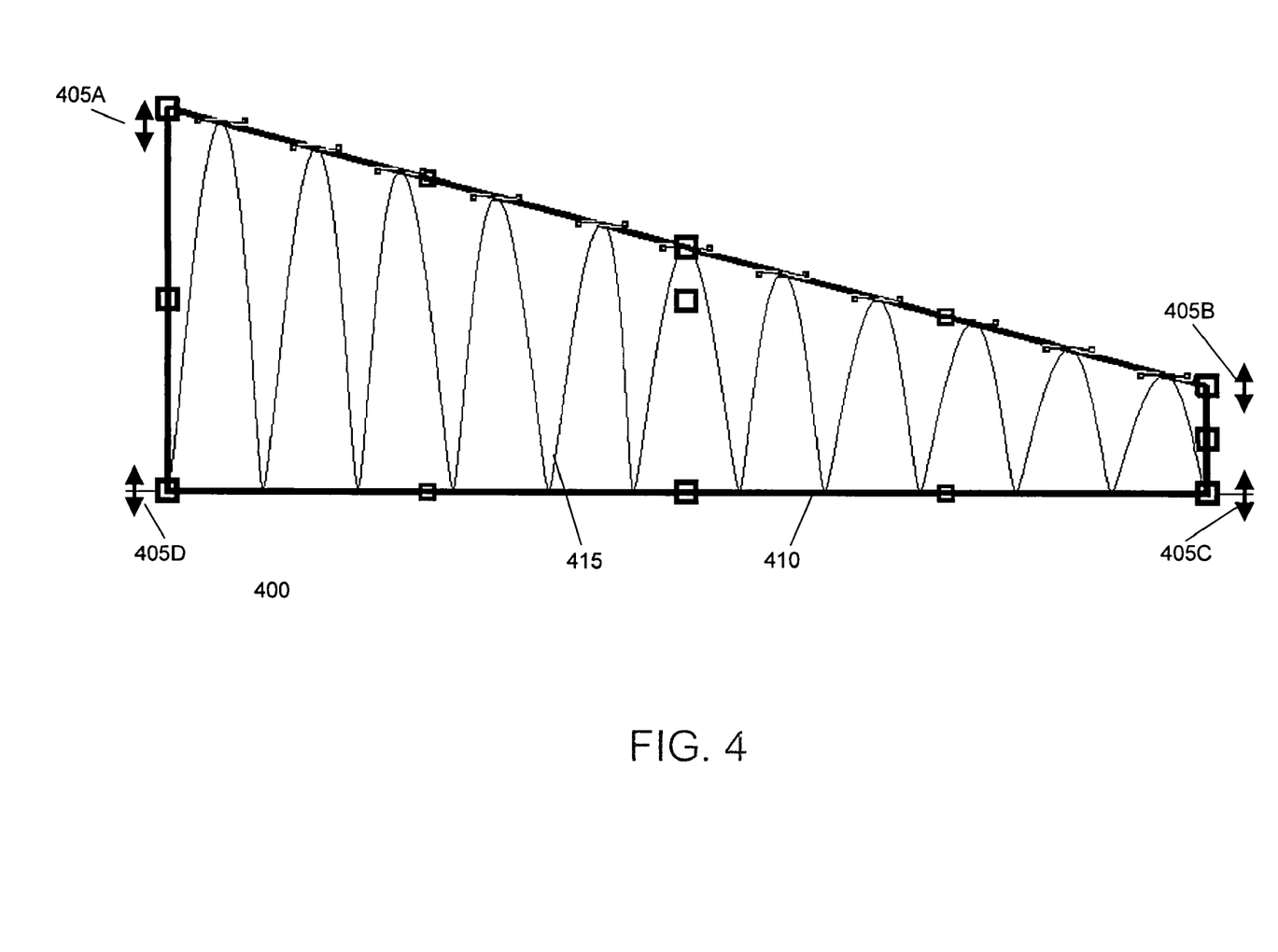
FIG. 4 illustrates an example transformation of computer graphics variable knots using a transformation interface according to an embodiment of the invention.

FIG. 4 illustrates an example transformation 400 of computer graphics variable knots. The corner transformation handles 405 can be dragged to scale the computer graphics variable values of the computer graphics variable knots. In this example, dragging the corner transformation handles 405 defines a trapezoidal transformation region 410. The scaling factor for the computer graphics variable values increases or decreases linearly according to the slope of the slanted side of the transformation region 410 and the scaling is centered around the opposite side of the transformation region 410. Alternatively, this transformation can be viewed as defining the transformation region to be the envelope of the computer graphics variable curve 415. Changing the shape of the transformation region 410 by dragging the corner transformation handles 405 will scale the computer graphics variable curve 415 and its respective knots to match the envelope defined by the transformation region 410.

Figure 5:
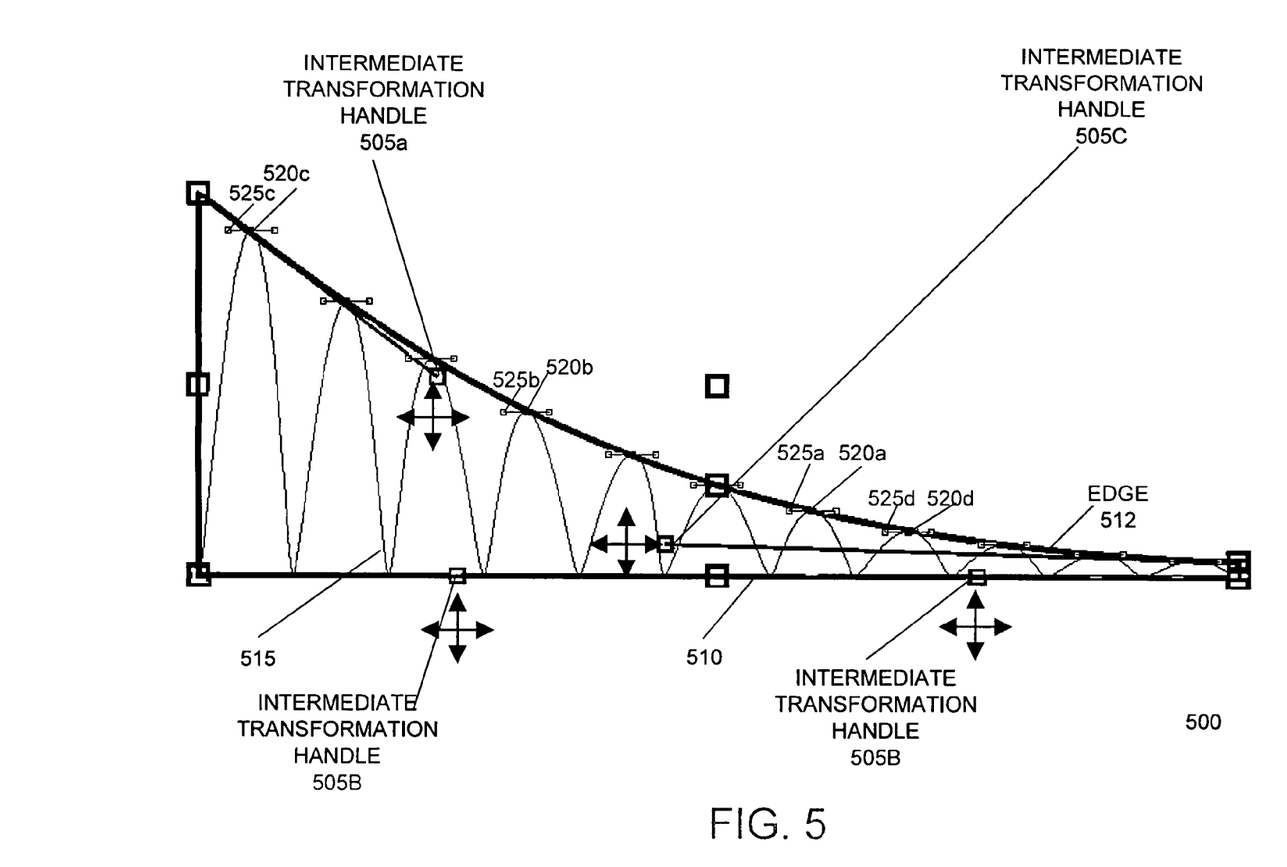
FIG. 5 illustrates an example transformation of computer graphics variable knots using a transformation interface according to an embodiment of the invention.

In addition to linear changes to the shape of the transformation region, an embodiment of the invention allows for nonlinear transformations of computer graphics variable knots. FIG. 5 illustrates an example transformation 500 of computer graphics variable knots. Dragging an intermediate transformation handle 505 on an edge of the transformation region 510 changes that edge into a Bezier or other type of curve. The computer graphics variable curve 515 and the computer graphics variable values of its associated knots are scaled to follow the envelope defined by the curved edges of the transformation region 510, as shown in FIG. 5.

In an embodiment, computer graphics variable knots are associated with tangent handles defining the slopes of the computer graphics variable curves. In a further embodiment, as computer graphics variable knots are scaled or transformed via the transformation region, the associated tangent handles of the computer graphics variable knots are scaled proportionally so that relative motion stays similar.

For example, if a computer graphics variable knot is at the top of the transformation region, and the top of the transformation region is dragged down so that it is now one half its former distance to the bottom of the box, the computer graphics variable knot will be moved accordingly so that it is still located at the top of the computer graphics variable transformation region. In an embodiment, the tangent handle of this computer graphics variable knot will be scaled so that it is halfway between its former slope value and flat. This modification of the slope can be applied to any of the above described operations that scale either the value or time of one or more computer graphics variable knots.

In this example, computer graphics variable knots 520 include tangent slope handles 525 representing the slope or tangent values of the computer graphics variable curve 515 at each of the computer graphics variable knots 520. In an embodiment, the tangent slope handles 525 are scaled by the same amount as the computer graphics variable values of their respective computer graphics variable knots 520, rather than following the edge or envelope of the transformation region 510 directly. For example, the tangent value represented by the tangent slope handle 525a and the computer graphics variable value of computer graphics variable knot 520a are scaled by the same scaling factor, which is determined by the height of edge 512 at the location of computer graphics variable knot 520. However, the tangent slope handle 525a remains flat in this example, rather than following the slope of edge 512. This ensures that the transformed computer graphics variable curve 515 remains a function of an input parameter associated with the horizontal axis, such as time, rather than becoming an arbitrary parametric curve.

Figure 6:
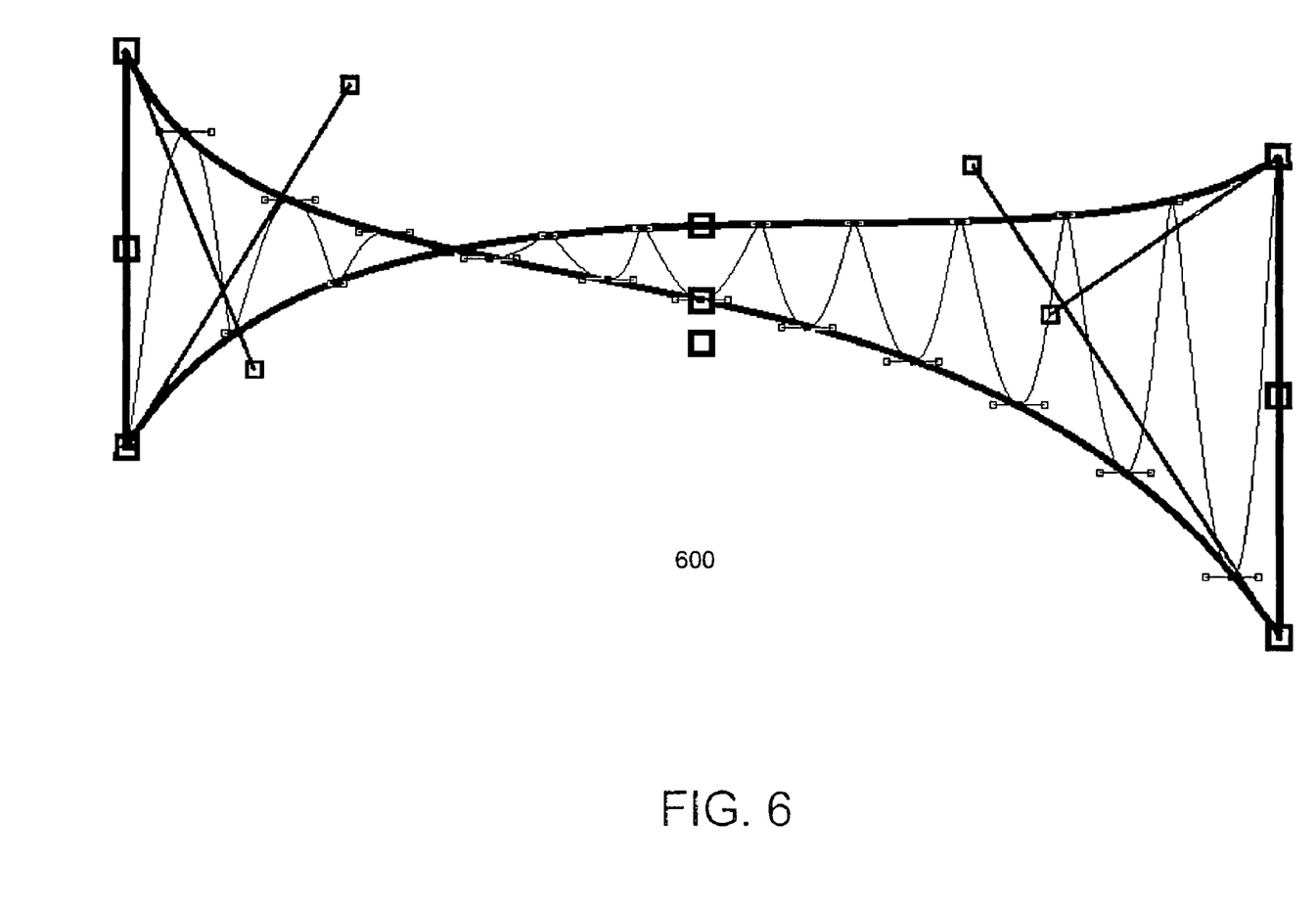
FIG. 6 illustrates an example transformation of computer graphics variable knots using a transformation interface according to an embodiment of the invention.

The intermediate transformation handles can be dragged to any positions to define an arbitrary envelope for the computer graphics variable curve, such as the example transformation 600 shown in FIG. 6.

Figure 7:
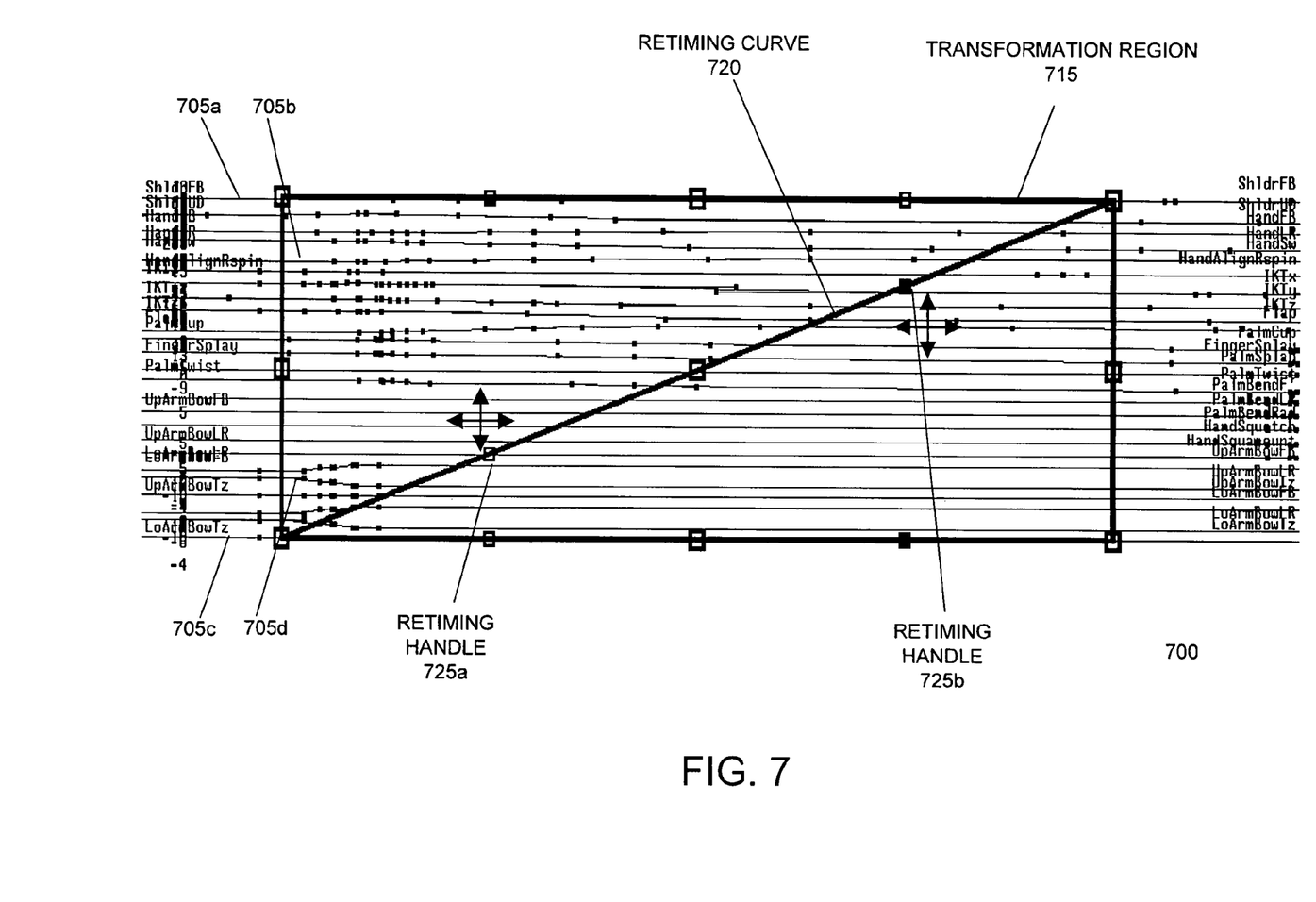
FIG. 7 illustrates an example selection of knots associated with multiple computer graphics variable for transformation according to embodiments of the invention.

In addition to transforming knots associated with a single computer graphics variable, an embodiment of the invention can be similarly applied to knots associated with multiple computer graphics variables. FIG. 7 illustrates an example selection 700 of knots 705 associated with multiple computer graphics variable for transformation according to embodiments of the invention. In FIG. 7, horizontal lines 710 represent animation curves of computer graphics variables each defined by one or more computer graphics variable knots. Computer graphics variable knots 705 are represented in FIG. 7 by small squares. For clarity, the values of the computer graphics variable knots 705, typically represented as vertical displacements, have been compressed in vertical scale so that the user can view the knots of a large number of computer graphics variables over time.

Upon selection of computer graphics variable knots 705 of one or more computer graphics variables, a transformation region 715 is presented around the selection. As discussed above, users can manipulate the transformation handles of the transformation region 715 to linearly or nonlinearly scale, translate, or otherwise transform computer graphics variable knots in value or time. Although the transformation region 715 is shown in FIG. 7 as enclosing multiple computer graphics variable curves, the transformation operations specified via interactions with the transformation region 715 are applied separately to each selected animation curve.

Additionally, this example transformation region 715 includes a retiming curve 720 and one or more retiming handles 725. The retiming curve 720 specifies a remapping of input values, such as time. In an embodiment, the horizontal axis of the retiming curve 720 represents the current range of input values of the selected computer graphics variable knots. The vertical axis of the retiming curve 720 represents the remapped input values of the computer graphics variable knots over the same range. A straight-line diagonal retiming curve 720 represents a one-to-one mapping of time values. If a point on the retiming curve 720 is below this diagonal, knots with this input value are remapped to a lower input value. If a point on the retiming curve 720 is above the diagonal, knots with this input value are remapped to a later input value.

By dragging the retiming handles 725 to new positions, the retiming curve 720 can be changed from a straight line to a curve, such as a Bezier or other type of curve. In accordance with the shape of the retiming curve 720, the input values of the selected computer graphics variable knots can be changed, for example changing the timing or pacing of the animation without affecting range of motion.

Figure 8:
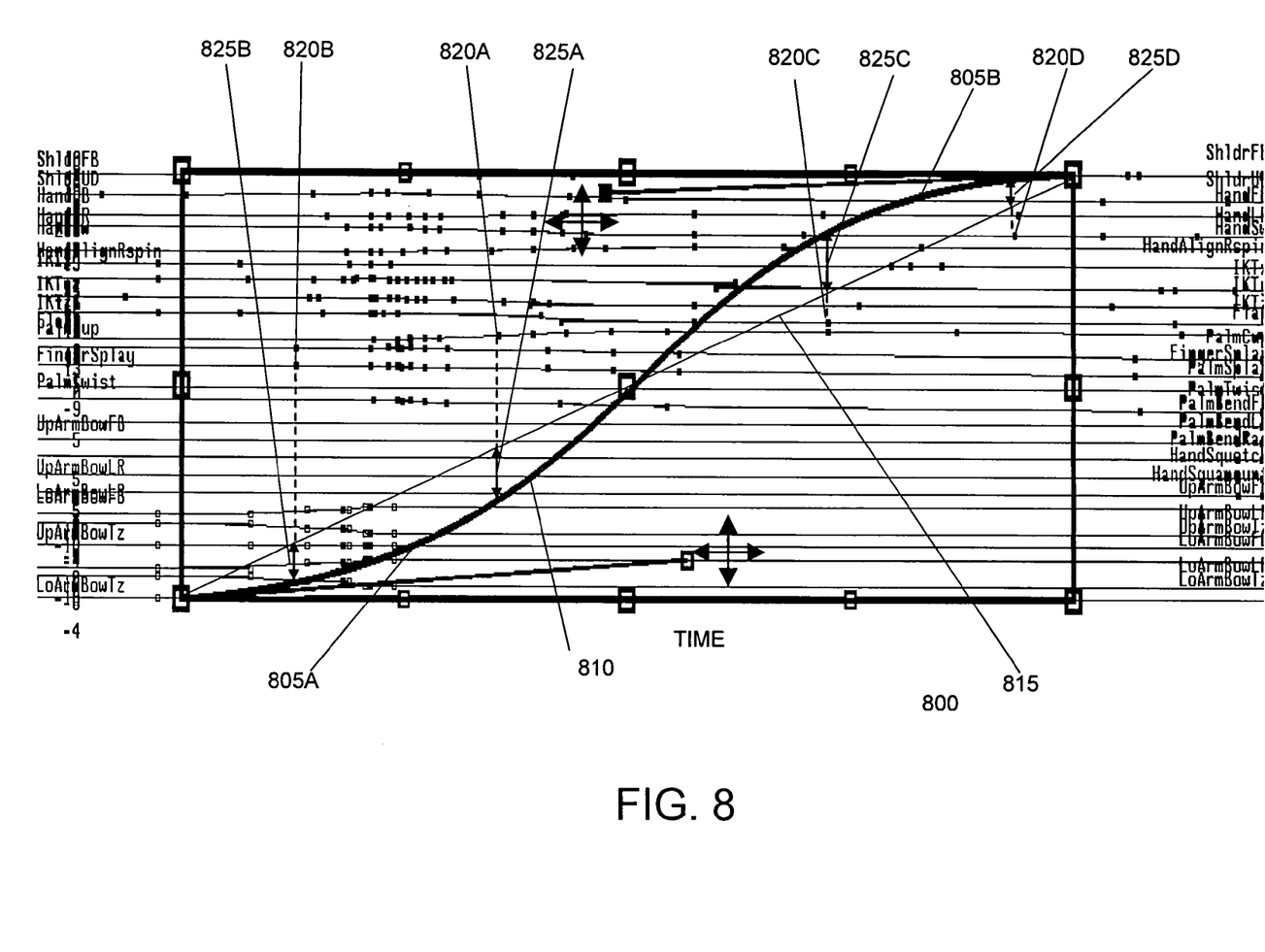
FIG. 8 illustrates an application of the retiming transformation using a transformation interface according to an embodiment of the invention.

FIG. 8 illustrates an application 800 of the retiming transformation according to an embodiment of the invention. Example 800 illustrates a selection of computer graphics variable knots 820, represented as squares, describing computer graphics variable values as functions of an input value, such as time, which is indicated on the horizontal axis. Example 800 includes an example retiming curve 810. For reference, a diagonal line 815 representing a one-to-one remapping of input values is shown as well.

Portion 805a of the retiming curve 810 is below the diagonal line 815. Thus, computer graphics variable knots within this input value range (e.g. within this time range) will be shifted to lower input values (e.g. earlier time input values). The magnitude of this shift in input value is proportional to the distance between the retiming curve 810 and the diagonal line 815 at the computer graphics variable knot's initial time input value. For example, computer graphics variable knot 820a will be shifted back in time by an amount proportional to distance 825a and computer graphics variable knot 820b will be shifted back in time by an amount proportional to distance 825b.

Similarly, portion 810b of the retiming curve 810 is above the diagonal line 815. Thus, computer graphics variable knots within this time range will be shifted to higher input values (e.g. later time input values). The magnitude of this shift in input value is proportional to the distance between the retiming curve 810 and the diagonal line 815 at the computer graphics variable knot's initial time input value. For example, computer graphics variable knot 820c will be shifted forward in time by an amount proportional to distance 825c and computer graphics variable knot 820d will be shifted forward in time by an amount proportional to distance 825d.

In this example 800, the selected computer graphics variable knots are redistributed in time so that motion begins slowly during the left flat portion of the retiming curve 810, accelerates in the steep portion of the retiming curve 810, and then slows down again in the right flat portion of the retiming curve 810. By changing the shape of the retiming curve 810, users can linearly or non-linearly adjust the relative timing between large numbers of computer graphics variable knots associated with one or more computer graphics variables.

Figure 9:
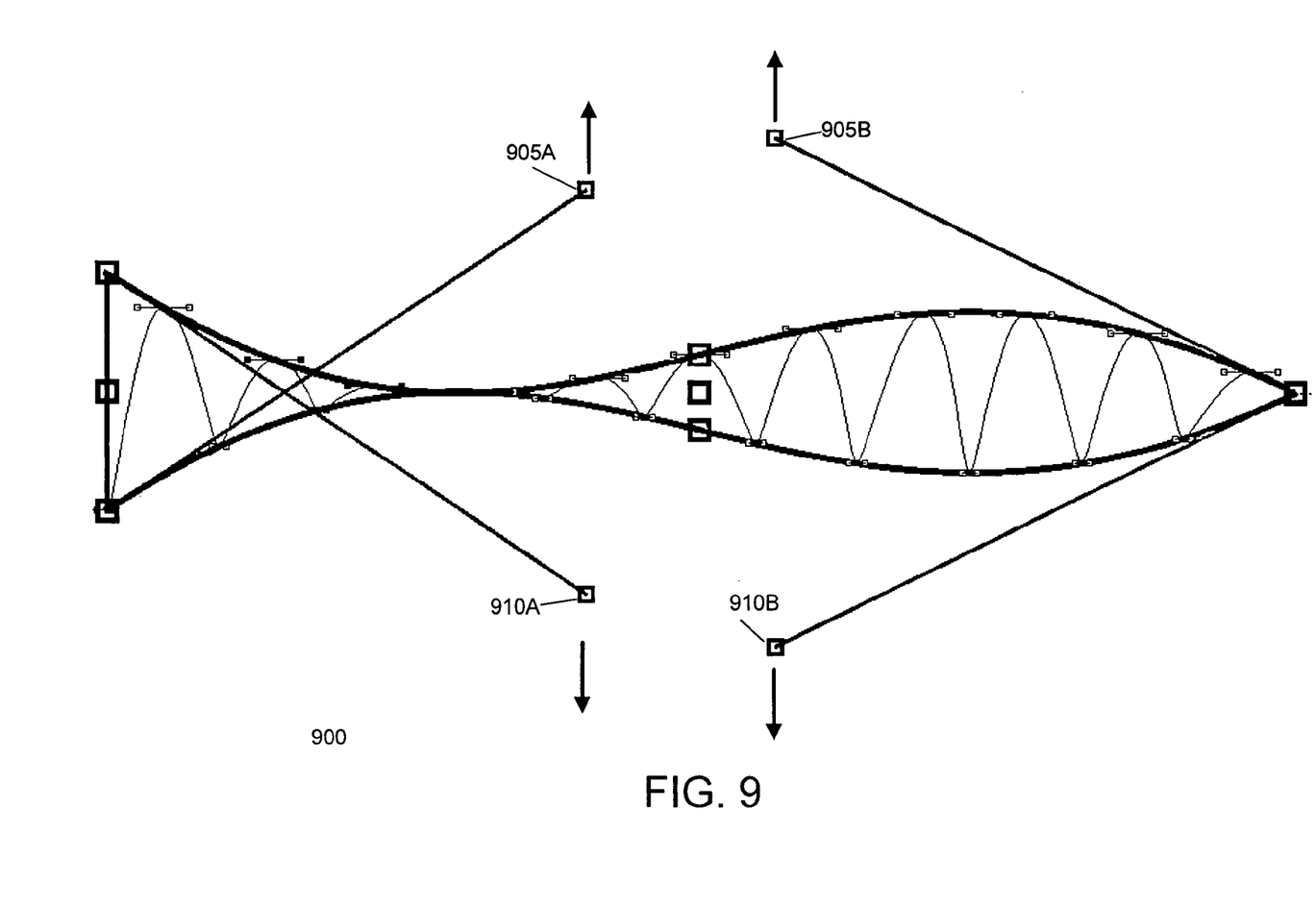
FIG. 9 illustrates an example application of a transformation using a transformation interface according to an embodiment of the invention.

In addition to moving individual transformation handles, an embodiment of the invention allows users to link the transformation handles together to enable mirrored or symmetrical transformations. Users can selectively activate or deactivate this symmetrical handle movement. FIG. 9 illustrates an example application 900 of a transformation according to an embodiment of the invention. In this example, moving one of the intermediate transformation handles 905 also moves the opposite transformation handle 910 in the opposite direction, thereby making the transformation symmetrical.

Figure 10:
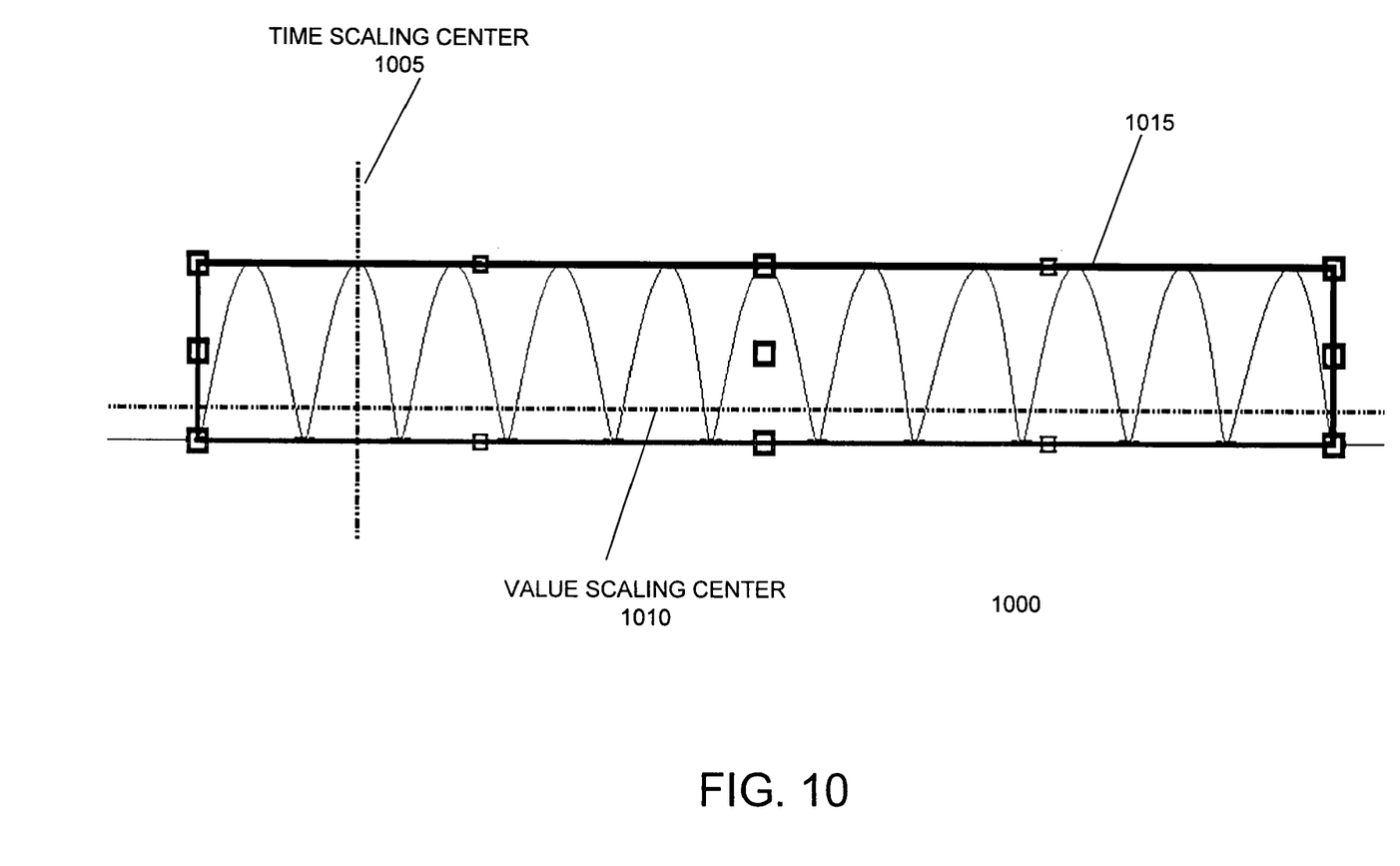
FIG. 10 illustrates the specification of scaling centers using a transformation interface according to an embodiment of the invention.

As discussed above, computer graphics variable knots can be scaled in value or in time centered around an edge of the transformation region. Additionally, users can specify the center points for scaling the values and/or times of computer graphics variable knots. FIG. 10 illustrates an example 1000 of the specification of a time scaling center 1005, indicated by the vertical dashed line. As the transformation region 1015 is resized in the horizontal direction, the time values of the selected computer graphics variable knots are scaled around the time scaling center 1005. Similarly, a user-specified value scaling center 1010, indicated by the dashed horizontal line, specifies a center around which computer graphics variable values of computer graphics variable knots are scaled when the transformation region 1015 is resized in the vertical direction.

Figure 11:
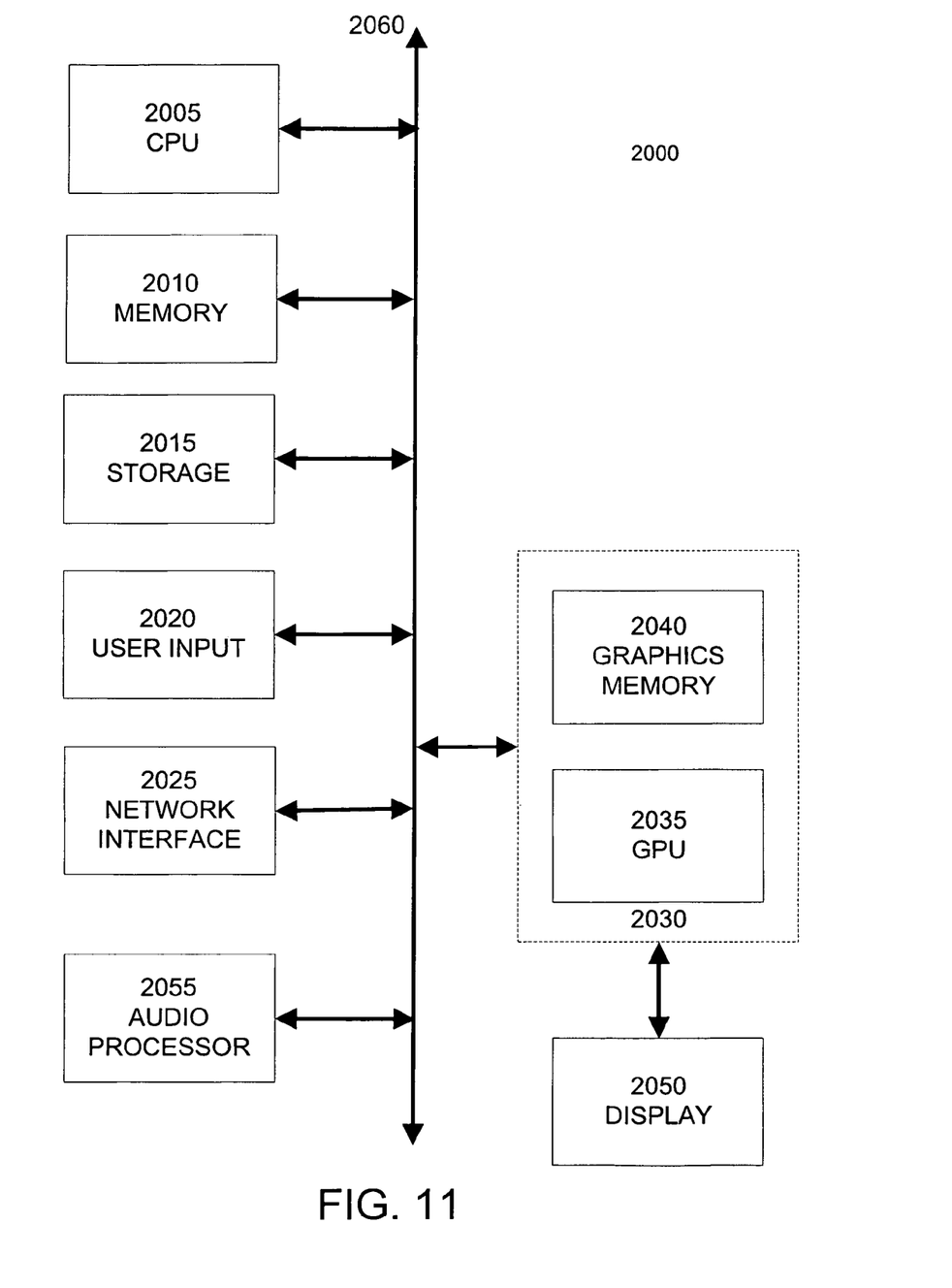
FIG. 11 illustrates a computer system suitable for implementing an embodiment of the invention.

FIG. 11 illustrates a computer system suitable for implementing an embodiment of the invention. FIG. 11 is a block diagram of a computer system 2000, such as a personal computer, video game console, personal digital assistant, or other digital device, suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Storage 2015 provides non-volatile storage for applications and data and may include fixed or removable hard disk drives, flash memory devices, and CD-ROM, DVD-ROM, Blu-ray, HD-DVD, or other magnetic, optical, or solid state storage devices.

User input devices 2020 communicate user inputs from one or more users to the computer system 2000, examples of which may include keyboards, mice, joysticks, digitizer tablets, touch pads, touch screens, still or video cameras, and/or microphones. Network interface 2025 allows computer system 2000 to communicate with other computer systems via an electronic communications network, and may include wired or wireless communication over local area networks and wide area networks such as the Internet. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to renderfarm or set of server computers, each similar to computer system 2000, via the network interface 2025 or storage 2015. The renderfarm generates one or more rendered images of the scene using the provided instructions and/or data. These rendered images are returned to the computer system 2000 for display.

Alternatively, CPU 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art. The GPU 2035 can further include one or more programmable execution units capable of executing shader programs. GPU 2035 can be comprised of one or more graphics processing unit cores.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into CPU 2005.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of modifying function data, the method comprising:

receiving a selection of knots of at least one function, each knot including a function input value, a function output value, and a function tangent value; displaying a transformation region including at least one transformation handle;

receiving a position of the at least one transformation handle; and transforming, via one or more processors, the selection of knots in accordance with the position of the at least one transformation handle to determine at least one transformed function, wherein the at least one transformed function includes a non-linear transformation.

2. The method of claim 1, wherein the selection of knots is associated with a single computer graphics variable function.

3. The method of claim 1, wherein the selection of knots is associated with at least two computer graphics variable functions.

4. The method of claim 1, wherein the transformation region encloses a graphical representation of the selection of knots.

5. The method of claim 1, wherein transforming includes scaling at least a portion of the selection of knots, wherein scaling includes scaling at least one of the function input value, the function output value, or the function tangent value of each knot within the at least a portion of the selection of knots.

6. The method of claim 5, wherein the scaling is centered around an edge of the transformation region.

7. The method of claim 5, further comprising:
receiving a transformation center line; and
scaling the at least a portion of the selection of knots around the transformation center line.

8. The method of claim 1, wherein the transformation region specifies an envelope of at least one function curve specified by the selection of knots, and wherein the position of the transformation handle creates a modified envelope, and wherein transforming the selection of knots includes transforming the selection of knots so that the function curve conforms with the modified envelope.

9. The method of claim 1, wherein the position of the at least one transformation handle specifies at least one curved edge of the transformation region, and wherein transforming the selection of knots includes applying a scaling factor to each knot within the selection of knots based on an attribute of the at least one curved edge at a location corresponding with the function input value of each knot within the selection of knots.

10. The method of claim 1, wherein transforming the selection of knots includes scaling the function tangent value of each knot within the selection of knots based on the position of the at least one transformation handle.

11. The method of claim 1, wherein the at least one function represents a computer graphics variable selected from a group consisting of an animation variable, a shader relationship, a weighting, and a mapping of influence of a first computer graphics component onto at least a second computer graphics component.

12. The method of claim 1, wherein the function input is associated with time.

13. A computer-implemented method of modifying function data, the method comprising:
receiving a selection of knots of at least one function, each knot including a function input value and a function output value;
displaying a transformation region including a retiming curve;
receiving a modification of the retiming curve defining a remapping of function input values;
for each knot within the selection of knots, modifying the function input value, via one or more processors, based on the function input value of each knot within the selection of knots and the retiming curve; and
specifying at least one modified function using the selection of knots including the modified function input values.

14. The method of claim 13, wherein the selection of knots is associated with a single computer graphics variable function.

15. The method of claim 13, wherein the selection of knots is associated with at least two computer graphics variable functions.

16. The method of claim 13, wherein the transformation region encloses a graphical representation of the selection of knots.

17. The method of claim 13, wherein the at least one function represents a computer graphics variable selected from a group consisting of an animation variable, a shader relationship, a weighting, and a mapping of influence of a first computer graphics component onto at least a second computer graphics component.

18. A computer-implemented method of modifying function data, the method comprising:
receiving a selection of knots of at least one non-linear function, each including a function input value, a function output value, and a function tangent value;
displaying a transformation region specifying an envelope of at least one function curve corresponding with the at least one non-linear function specified by the selection of knots;
receiving a modified transformation region specifying a modified envelope; and
transforming the selection of knots, via one or more processors, to conform with the modified envelope, wherein transforming includes scaling the function tangent value of each knot within the selection of knots;
wherein the modified transformation region includes at least one curved edge, and wherein transforming the selection includes applying a scaling factor to each one of the selection of knots based on an attribute of the at least one curved edge corresponding with the function input value for each of the knots.

19. The method of claim 18, further comprising:
applying the scaling factor to the function tangent value of each knot within the selection of knots.

20. The method of claim 18, wherein the modified transformation region specifies a retiming curve specifying a mapping of the function input value of each knot within the selection of knots to new function input values, and wherein transforming the selection of knots includes determining a new function input value for each knot within the selection of knots based on the retiming curve.

21. The method of claim 18, wherein the selection of knots is associated with a single computer graphics variable.

22. The method of claim 18, wherein the selection of knots is associated with at least two computer graphics variables.

23. The method of claim 18, wherein the function input is associated with time.

24. A computer-implemented method of modifying function data, the method comprising:
receiving a selection of knots of at least one function, each knot including a function input value, a function output value, and a function tangent value;
displaying a transformation region including at least one transformation handle;
receiving a position of the at least one transformation handle; and
transforming, via one or more processors the selection of knots in accordance with the position of the at least one transformation handle to determine at least one transformed function;
wherein the position of the at least one transformation handle specifies at least one curved edge of the transformation region, and wherein transforming the selection of knots includes applying a scaling factor to each knot within the selection of knots based on an attribute of the at least one curved edge at a location corresponding with the function input value of each knot within the selection of knots.

25. A computer-implemented method of modifying function data, the method comprising:

receiving a selection of knots of at least one non-linear function, each including a function input value, a function output value, and a function tangent value;

displaying a transformation region specifying an envelope of at least one function curve corresponding with the at least one non-linear function specified by the selection of knots;

receiving a modified transformation region specifying a modified envelope; and transforming, via one or more processors the selection of knots to conform with the modified envelope, wherein transforming includes scaling the function tangent value of each knot within the selection of knots;

wherein the modified transformation region specifies a retiming curve specifying a mapping of the function input value of each knot within the selection of knots to new function input values, and wherein transforming the selection of knots includes determining a new function input value for each knot within the selection of knots based on the retiming curve.

* * * * *